(12) United States Patent
Dimou et al.

(10) Patent No.: US 12,549,230 B2
(45) Date of Patent: Feb. 10, 2026

(54) BEAM BLOCKING DETECTION AND REPORTING

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/995,039

(22) PCT Filed: May 20, 2021

(86) PCT No.: PCT/US2021/033421
§ 371 (c)(1),
(2) Date: Sep. 29, 2022

(87) PCT Pub. No.: WO2021/242604
PCT Pub. Date: Dec. 2, 2021

(65) Prior Publication Data
US 2023/0130407 A1 Apr. 27, 2023

(30) Foreign Application Priority Data
May 27, 2020 (GR) .............................. 20200100281

(51) Int. Cl.
*H04B 7/06* (2006.01)
*H04B 17/318* (2015.01)
(Continued)

(52) U.S. Cl.
CPC ......... *H04B 7/0626* (2013.01); *H04B 17/318* (2015.01); *H04W 16/28* (2013.01); *H04W 24/10* (2013.01)

(58) Field of Classification Search
CPC .... H04B 7/062; H04B 17/318; H04B 7/0695; H04W 16/28; H04W 24/10
See application file for complete search history.

(56) References Cited

U.S. PATENT DOCUMENTS 11,223,411 B2 * 1/2022 Abedini ............... H04W 56/001
11,678,203 B2 * 6/2023 Dimou ................. H04L 1/0009
370/329

(Continued)

FOREIGN PATENT DOCUMENTS

CN 103516464 A 1/2014
CN 109478918 A 3/2019

(Continued)

OTHER PUBLICATIONS

International Search Report and Written Opinion—PCT/US2021/033421—ISA/EPO—Oct. 25, 2021.

(Continued)

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment may receive a channel state information (CSI) report configuration that indicates one or more parameters associated with detecting eam blocking; calculate one or more values corresponding to the one or more parameters based at least in part on measuring downlink reference signals indicated in the CSI report configuration; and transmit a report that indicates the one or more values of the one or more parameters. Numerous other aspects are provided.

30 Claims, 10 Drawing Sheets

(51) Int. Cl.
*H04W 16/28* (2009.01)
*H04W 24/10* (2009.01)

(56) References Cited

U.S. PATENT DOCUMENTS

| | | | |
|---|---|---|---|
| 2017/0290053 A1 | 10/2017 | Hwang et al. | |
| 2018/0227031 A1* | 8/2018 | Guo | H04W 24/10 |
| 2019/0081686 A1* | 3/2019 | Wang | H04B 7/088 |
| 2019/0306909 A1 | 10/2019 | Zhou et al. | |
| 2020/0092785 A1 | 3/2020 | Yang | |
| 2020/0137657 A1* | 4/2020 | Chavva | H04B 7/0695 |
| 2021/0167821 A1* | 6/2021 | Chen | H04B 7/0617 |
| 2021/0329624 A1* | 10/2021 | Huang | H04L 5/0051 |
| 2023/0123975 A1* | 4/2023 | Zhang | H04W 56/001 |
| | | | 370/329 |
| 2023/0199535 A1* | 6/2023 | Dimou | H04B 7/088 |
| | | | 370/252 |
| 2023/0299883 A1* | 9/2023 | Dimou | H04L 1/1671 |
| | | | 370/329 |

FOREIGN PATENT DOCUMENTS

| | | | |
|---|---|---|---|
| CN | 110169116 A | 8/2019 | |
| WO | WO-2018232090 A1 | 12/2018 | |
| WO | WO-2020233299 A1 * | 11/2020 | ........... H04W 72/23 |
| WO | WO-2020259832 A1 * | 12/2020 | ........... H04B 7/0632 |

OTHER PUBLICATIONS

Partial International Search Report—PCT/US2021/033421—ISA/EPO—Sep. 2, 2021.

* cited by examiner

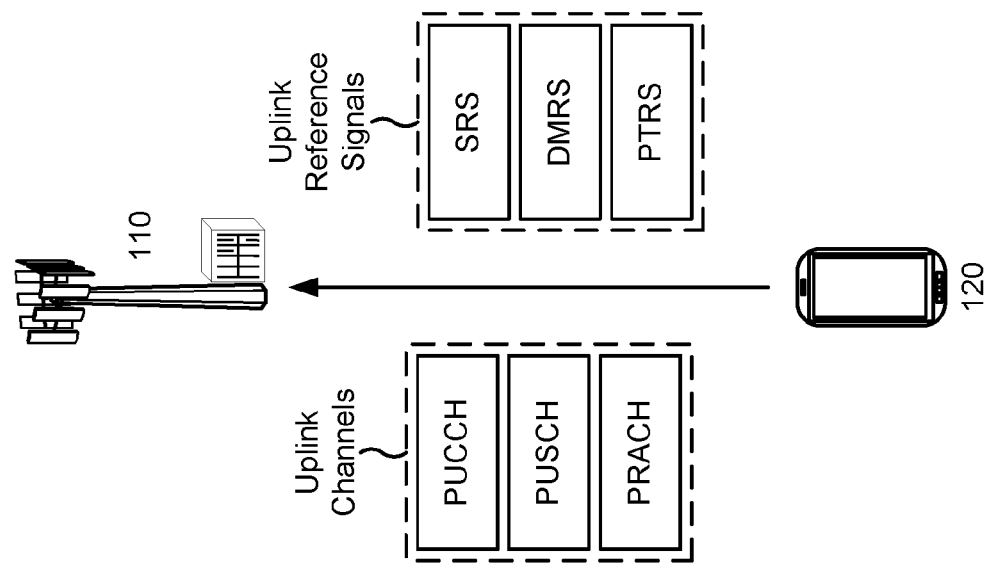
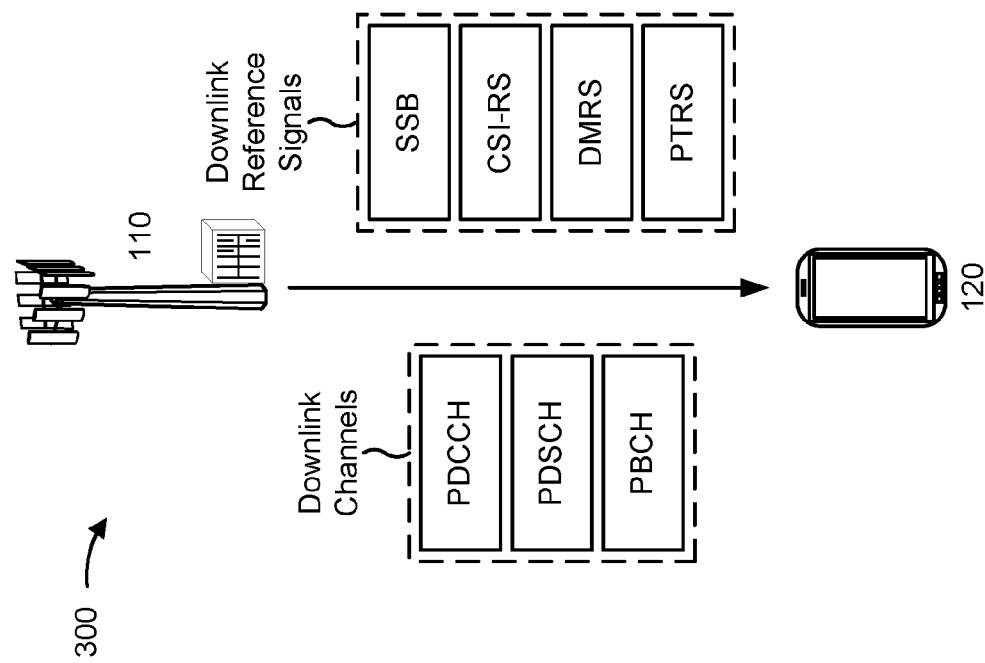
FIG. 3

```
CSI-ReportConfig ::=         SEQUENCE {
reportQuantity              CHOICE {
    none                        NULL,
    cri-RI-PMI-CQI              NULL,
    cri-RI-i1                   NULL,
    cri-RI-i1-CQI               SEQUENCE {
        pdsch-BundleSizeForCSI      ENUMERATED {n2,
n4}                         OPTIONAL    -- Need S
    },
    cri-RI-CQI                  NULL,
    cri-RSRP                    NULL,
    ssb-Index-RSRP              NULL,
    cri-RI-LI-PMI-CQI           NULL
    ssb-Index-RSRP-BeamCoherenceTimeBWPAverage  ← 715
    ssb-Index-RSRP-MaxAcrossPRBs                ← 720
    ssb-Index-RSRP-MinAcrossPRBs                ← 725
    ssb-Index-RSRP-Wideband-Delta-AcrossPRBs    ← 730
    ssb-Index-RSRP-Wideband-Delta-Time          ← 735
    ssb-Index-RSRP-PerPRB-Delta                 ← 740
```

← 705 (reportQuantity)

710 (brace around ssb-Index-RSRP-* entries)

BEAM BLOCKING DETECTION AND REPORTING

CROSS-REFERENCE TO RELATED APPLICATIONS

This Patent Application is a 371 national stage of PCT Application No. PCT/US2021/033421 filed on May 20, 2021, entitled "BEAM BLOCKING DETECTION AND REPORTING", which claims priority to Greece patent application Ser. No. 20/200100281, filed on May 27, 2020, entitled "BEAM BLOCKING DETECTION AND REPORTING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for beam blocking detection and reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving a channel state information (CSI) report configuration that indicates one or more parameters associated with detecting beam blocking; calculating one or more values corresponding to the one or more parameters based at least in part on measuring downlink reference signals indicated in the CSI report configuration; and transmitting a report that indicates the one or more values of the one or more parameters.

In some aspects, a method of wireless communication, performed by a base station, may include transmitting, to a user equipment (UE), a CSI report configuration that indicates one or more parameters associated with detecting beam blocking; transmitting, to the UE, downlink reference signals indicated in the CSI report configuration; and receiving, from the UE, a report that indicates one or more values of the one or more parameters.

In some aspects, a method of wireless communication, performed by a base station, may include transmitting, to a UE, a sounding reference signal (SRS) configuration that indicates an SRS resource set for transmission of SRSs; measuring one or more SRSs in the SRS resource set; and calculating one or more values corresponding to one or more parameters associated with detecting beam blocking based at least in part on measuring the one or more SRSs.

In some aspects, a UE for wireless communication for wireless communication may include a memory and one or more processors coupled to the memory. The memory and the one or more processors may be configured to receive a CSI report configuration that indicates one or more parameters associated with detecting beam blocking; calculate one or more values corresponding to the one or more parameters based at least in part on measuring downlink reference signals indicated in the CSI report configuration; and transmit a report that indicates the one or more values of the one or more parameters.

In some aspects, a base station for wireless communication may include a memory and one or more processors coupled to the memory. The one or more processors may be configured to transmit, to a UE, a CSI report configuration that indicates one or more parameters associated with detecting beam blocking; transmit, to the UE, downlink reference signals indicated in the CSI report configuration; and receive, from the UE, a report that indicates one or more values of the one or more parameters.

In some aspects, a base station for wireless communication may include a memory and one or more processors coupled to the memory. The one or more processors may be configured to transmit, to a UE, an SRS configuration that indicates an SRS resource set for transmission of SRSs; measure one or more SRSs in the SRS resource set; and calculate one or more values corresponding to one or more parameters associated with detecting beam blocking based at least in part on measuring the one or more SRSs.

In some aspects, a non-transitory computer-readable medium may store one or more instructions for wireless communication. The one or more instructions, when executed by one or more processors of a UE, may cause the one or more processors to receive a CSI report configuration that indicates one or more parameters associated with detecting beam blocking; calculate one or more values corresponding to the one or more parameters based at least in part on measuring downlink reference signals indicated in the CSI report configuration; and transmit a report that indicates the one or more values of the one or more parameters.

In some aspects, a non-transitory computer-readable medium may store one or more instructions for wireless communication. The one or more instructions, when executed by one or more processors of a base station, may cause the one or more processors to transmit, to a UE, a CSI report configuration that indicates one or more parameters associated with detecting beam blocking; transmit, to the UE, downlink reference signals indicated in the CSI report configuration; and receive, from the UE, a report that indicates one or more values of the one or more parameters.

In some aspects, a non-transitory computer-readable medium may store one or more instructions for wireless communication. The one or more instructions, when executed by one or more processors of a base station, may cause the one or more processors to transmit, to a UE, an SRS configuration that indicates an SRS resource set for transmission of SRSs; measure one or more SRSs in the SRS resource set; and calculate one or more values corresponding to one or more parameters associated with detecting beam blocking based at least in part on measuring the one or more SRSs.

In some aspects, an apparatus for wireless communication may include means for receiving a CSI report configuration that indicates one or more parameters associated with detecting beam blocking; means for calculating one or more values corresponding to the one or more parameters based at least in part on measuring downlink reference signals indicated in the CSI report configuration; and means for transmitting a report that indicates the one or more values of the one or more parameters.

In some aspects, an apparatus for wireless communication may include means for transmitting, to a UE, a CSI report configuration that indicates one or more parameters associated with detecting beam blocking; means for transmitting, to the UE, downlink reference signals indicated in the CSI report configuration; and means for receiving, from the UE, a report that indicates one or more values of the one or more parameters.

In some aspects, an apparatus for wireless communication may include means for transmitting, to a UE, an SRS configuration that indicates an SRS resource set for transmission of SRSs; means for measuring one or more SRSs in the SRS resource set; and means for calculating one or more values corresponding to one or more parameters associated with detecting beam blocking based at least in part on measuring the one or more SRSs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

FIGS. 5-7 are diagrams illustrating examples associated with beam blocking detection and reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
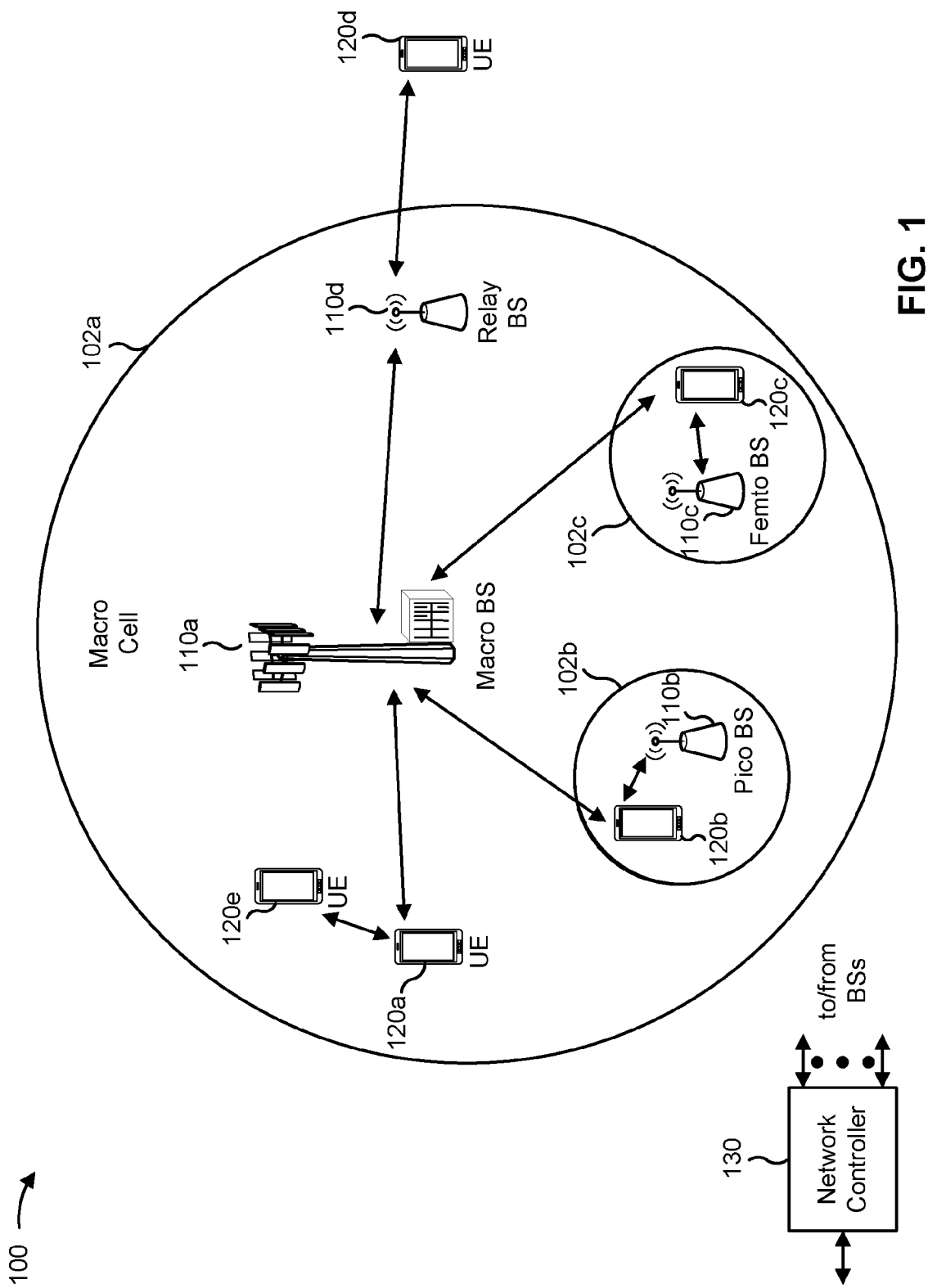
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network, an LIE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz — 300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
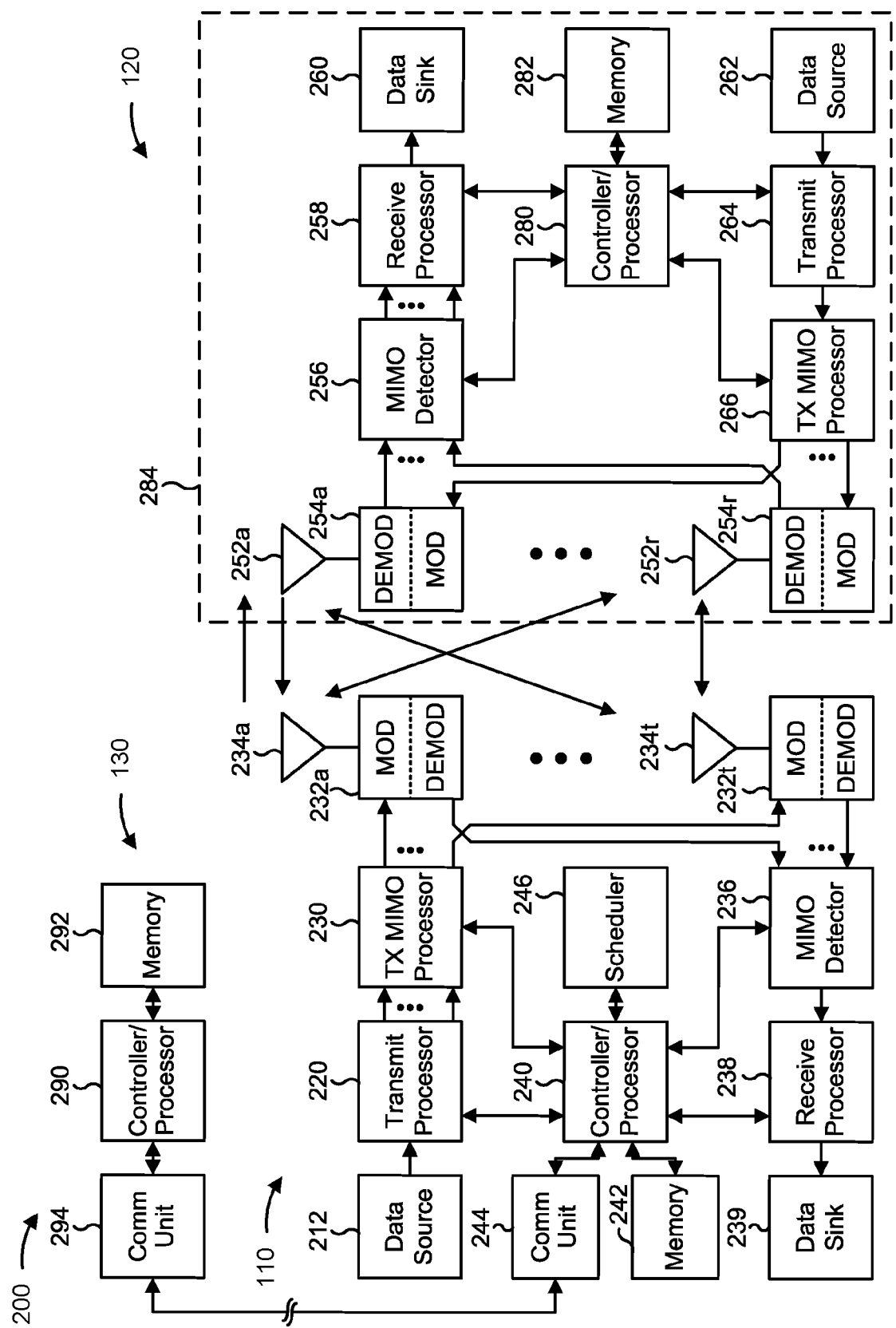
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), CQI, and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-8.

Controller/processor 240 of base station 110, controller/processor 280 of UE 120, and/or any other component(s) of FIG. 2 may perform one or more techniques associated with beam blocking detection and reporting, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for receiving a CSI report configuration that indicates one or more parameters associated with detecting beam blocking; means for calculating one or more values corresponding to the one or more parameters based at least in part on measuring downlink reference signals indicated in the CSI report configuration; means for transmitting a report that indicates the one or more values of the one or more parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a CSI report configuration that indicates one or more parameters associated with detecting beam blocking; means for transmitting, to the UE, downlink reference signals indicated in the CSI report configuration; means for receiving, from the UE, a report that indicates one or more values of the one or more parameters; and/or the like. Additionally, or alternatively, base station 110 may include means for transmitting, to a UE, an SRS configuration that indicates an SRS resource set for transmission of SRSs; means for measuring one or more SRSs in the SRS resource set; means for calculating one or more values corresponding to one or more parameters associated with detecting beam blocking based at least in part on measuring the one or more SRSs; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. In some aspects, the UE 120 may measure SSBs, may perform channel estimation based at least in part on measuring the SSBs, and may report channel estimation parameters to the base station 110 based at least in part on measuring the SSBs. In some aspects, the channel estimation parameters determining using SSB measurements may be reported in a CSI report.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
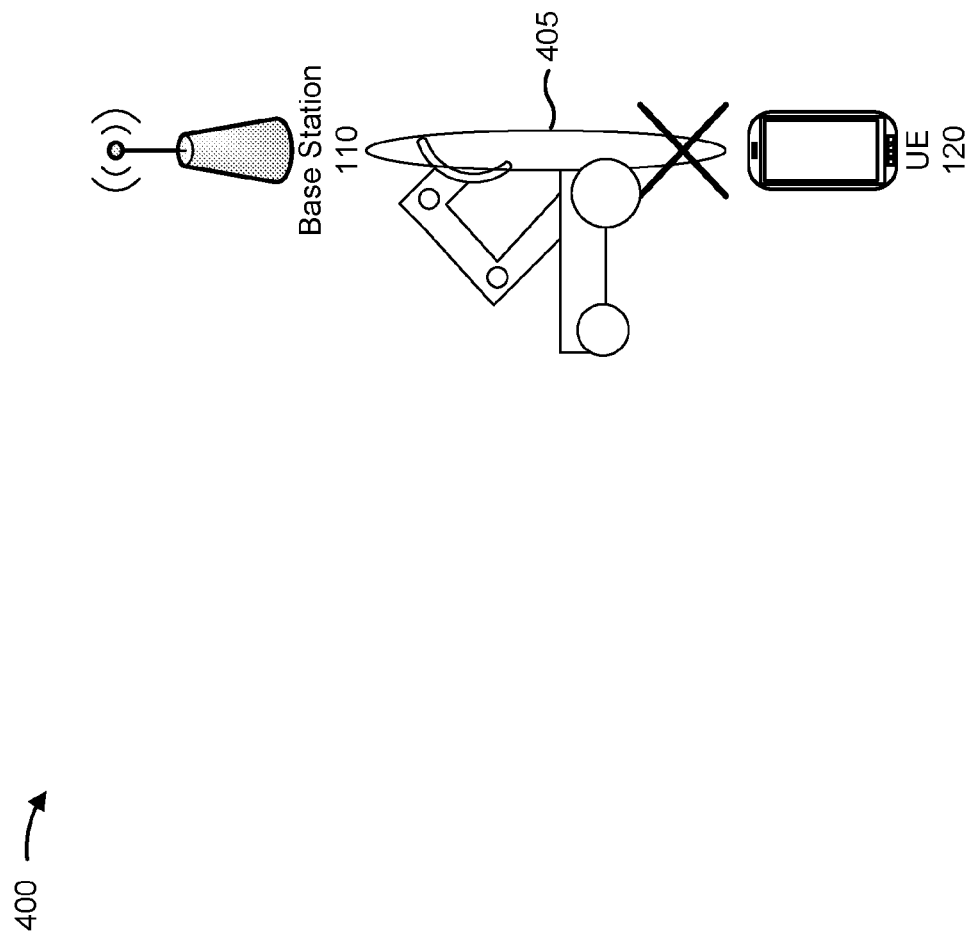
FIG. 4 is a diagram illustrating an example of beam blocking, in accordance with the present disclosure.

FIG. 4 is a diagram illustrating an example 400 of beam blocking, in accordance with the present disclosure.

As shown in FIG. 4, a base station 110 and a UE 120 may communicate with one another via one or more beams 405, which may include an uplink beam, a downlink beam, a beam pair, and/or the like. As further shown, the beam 405 may become blocked, such as when an obstruction interrupts a propagation path of the beam 405. In example 400, a mobile robot is shown as blocking the path of the beam 405, which may occur in a factory automation environment. However, other types of obstructions may block the beam 405 in other environments or scenarios.

Beam blocking may result in an abrupt decrease (e.g., below a threshold, such as a noise floor) in the useful signal strength received for the beam 405 and/or one or more adjacent beams in a beam set that includes the beam 405. This degradation in signal strength may occur across the entire system bandwidth on those beams (e.g., rather than being isolated to one or more frequencies) for a duration of time. This may result in communication errors, such as dropped communications, failed reception, failed demodulation, failed decoding, and/or the like. However, the received signal strength on other beams that are not blocked may be unaffected or may be above a threshold (e.g., the noise floor) such that beam switching to one of these beams provides a viable link between the UE 120 and the base station 110.

When beam blocking occurs, it may be useful for the base station 110 to modify or reconfigure communications with the UE 120, such as by performing a beam switching or beam management procedure to switch to a different beam, retransmitting a communication on the blocked beam (e.g., once a blocking event has ended, such as when an obstruction moves out of the propagation path of the beam 405), and/or the like. Furthermore, it may be useful for the base station 110 to be able to determine whether poor communication conditions with the UE 120 are due to beam blocking or are due to some other factor so that the base station 110 can take appropriate corrective action. For example, the base station 110 may perform link adaptation for the beam 405 if the base station 110 determines that the beam 405 is not blocked.

However, existing reporting mechanisms may not enable the base station 110 to determine whether beam blocking has occurred, or may require the base station 110 to perform complex calculations on parameters reported by each UE 120 in communication with the base station 110 to determine whether beam blocking has occurred for any of those UEs 120. Some techniques and apparatuses described herein enable reporting of parameters (e.g., beam blocking parameters) by a UE 120 to the base station 110 to indicate whether beam blocking has occurred. This enables the base station 110 to quickly determine whether beam blocking has occurred for a UE 120 (e.g., without performing complex processing that takes time and consumes base station resources, such as memory and processing resources) and to take corrective action based at least in part on that determination. In this way, system performance can be improved, communication errors can be reduced, latency can be reduced, and resources of the base station 110 can be conserved.

As indicated above, FIG. 4 is provided as an example. Other examples may differ from what is described with regard to FIG. 4.

Figure 5:
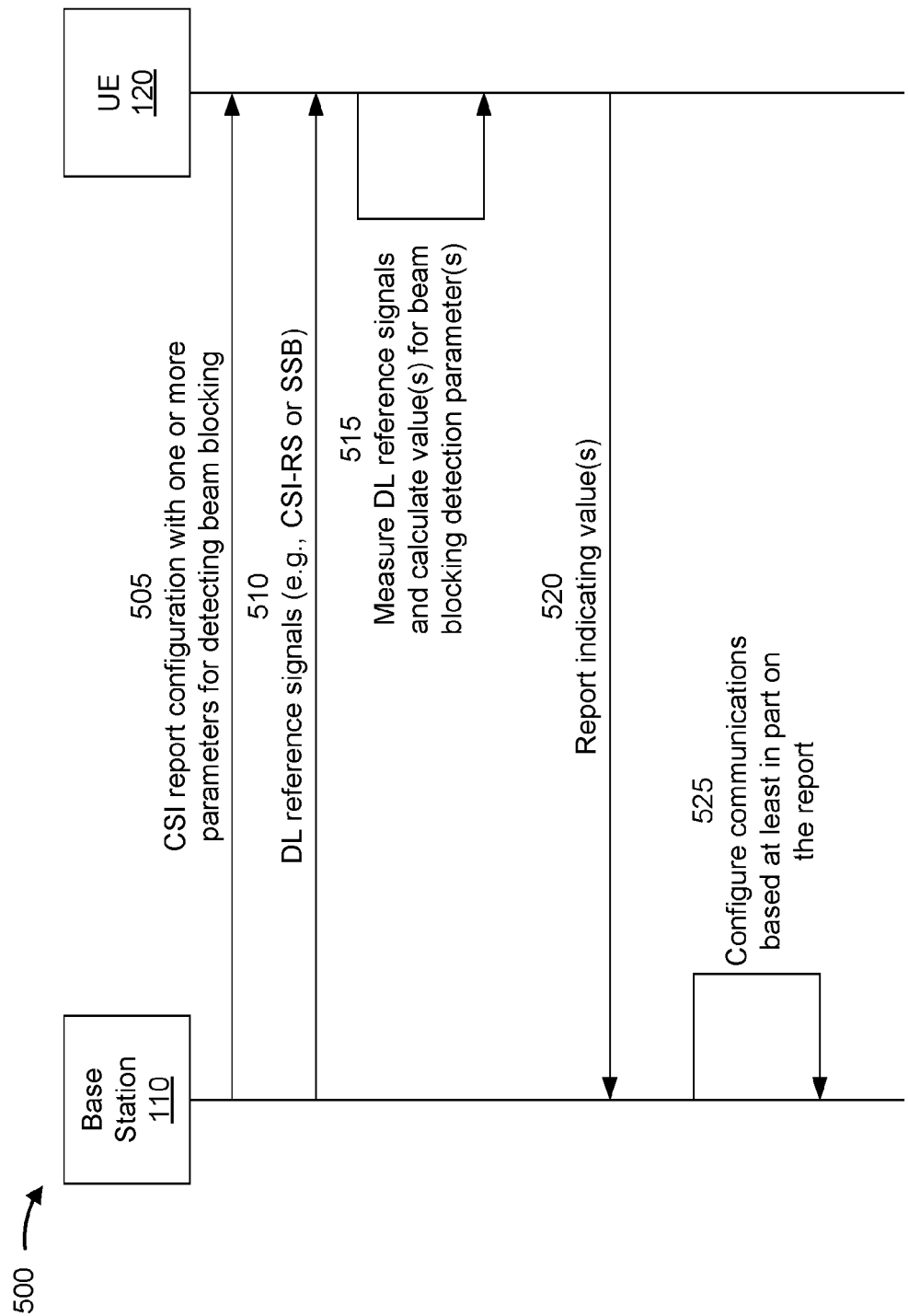

FIG. 5 is a diagram illustrating an example 500 associated with beam blocking detection and reporting, in accordance with the present disclosure. As shown in FIG. 5, a base station 110 and a UE 120 may communicate with one another.

As shown by reference number 505, the base station 110 may transmit, to the UE 120, a CSI report configuration that indicates one or more parameters associated with detecting beam blocking. The CSI report configuration may be transmitted in a configuration message, such as a radio resource control (RRC) message (e.g., an RRC configuration message, an RRC reconfiguration message, and/or the like). In some aspects, the one or more parameters are configured in association with a CRI for wideband CSI reporting. Additionally, or alternatively, the one or more parameters may be configured or in association with an SSB index. Thus, the CSI report configuration (or another configuration associated with reporting channel estimation parameters) may indicate a configuration for CSI-RSs, a configuration for SSBs, or a combination thereof. In such examples, the one or more parameters may be determined based at least in part on CSI-RS measurements, SSB measurements, or a combination thereof. Additional details regarding the CSI report configuration and the one or more parameters associated with detecting beam blocking (sometimes referred to as beam blocking detection parameters) are described in more detail below in connection with FIG. 6 and FIG. 7. Although the one or more parameters are described herein in connection with detecting beam blocking, the one or more parameters can be used generally for other purposes, such as for indicating and/or determining a reason for a transmission error or a communication error.

As shown by reference number 510, the base station 110 may transmit one or more downlink reference signals to the UE 120 based at least in part on the CSI report configuration. The one or more downlink reference signals may include one or more CSI-RSs and/or one or more SSBs. In some aspects, the base station 110 may transmit one or more CSI-RSs to the UE 120. For example, the base station 110 may configure CSI-RS resources, for transmission of CSI-RSs, in the CSI report configuration. The base station 110 may then transmit CSI-RSs in the configured CSI-RS resources. Additionally, or alternatively, the base station 110 may transmit one or more SSBs to the UE 120. For example, the base station 110 may configure SSB resources, for transmission of SSBs, in the CSI report configuration (or in another configuration associated with reporting channel estimation parameters). The base station 110 may then transmit SSBs in the configured SSB resources.

As shown by reference number 515, the UE 120 may measure the downlink reference signals (e.g., the CSI-RSs and/or the SSBs) received from the base station 110 (e.g., on the configured CSI-RS resources and/or the configured SSB resources). The UE 120 may calculate one or more values corresponding to the one or more beam blocking detection parameters based at least in part on the measurements. As an example, a value of a parameter may be reported in decibels (dB), decibel milliwatts (dBm), and/or the like. Additional details regarding calculating a value for a beam blocking detection parameter are described below in connection with FIG. 6 and FIG. 7.

As shown by reference number 520, the UE 120 may transmit a report to the base station 110, and the report may indicate the one or more values calculated by the UE 120 for the one or more beam blocking detection parameters. In some aspects, the report may be a CSI report. Additionally, or alternatively, the report may be a report that indicates channel estimation parameters. Additionally, or alternatively, the report may be associated with and/or may be transmitted in connection with a negative acknowledgement of a communication. Additionally, or alternatively, the report may be associated with and/or may be transmitted in connection with a request for a new beam (e.g., a request to perform a beam selection procedure, a request to perform a beam management procedure, a request to perform a beam refinement procedure, and/or the like). In some aspects, the UE 120 may transmit the report using uplink beam sweeping. For example, the UE 120 may transmit the report using uplink beam sweeping if the UE 120 determines that the one or more values indicate that an active beam being used to communicate with the base station 110 is blocked. By using uplink beam sweeping to transmit the report, the UE 120 may increase the likelihood that the report is received by the base station 110.

As shown by reference number 525, the base station 110 may configure one or more communications with the UE 120 and/or may communicate with the UE 120 based at least in part on the report. For example, if the one or more values in the report indicate that a beam being used for communication between the UE 120 and the base station 110 (e.g., an active beam) is blocked, then the base station 110 may identify and/or select a new beam for communication with the UE 120, and may communicate with the UE 120 using the new beam. For example, the base station 110 may perform a beam selection procedure, a beam refinement procedure, a beam management procedure, and/or the like, to select the new beam. In some aspects, the base station 110 may retransmit a failed communication using the new beam.

Alternatively, if the one or more values in the report indicate that an active beam is not blocked, then the base station 110 may continue to communicate with the UE 120 using the active beam. However, if the one or more values indicate poor channel conditions despite the active beam not being blocked, then the base station 110 may perform radio link adaptation in connection with the active beam. For example, the base station 110 may perform radio link adaptation by modifying one or more transmission parameters used for the active beam, such as a number of transmission layers (e.g., a rank), a precoding matrix (e.g., a precoder), an MCS, a transmit power, and/or the like. In some aspects, the base station 110 may retransmit a failed communication on the active beam after performing radio link adaptation (e.g., using the modified one or more transmission parameters).

By enabling the UE 120 to report beam blocking detection parameters, some techniques and apparatuses described herein enable the base station 110 to quickly determine whether beam blocking has occurred for the UE 120 without performing complex processing that takes time and consumes base station resources (e.g., memory resources, processing resources, and/or the like). As a result, the base station 110 may be able to take corrective action faster than if the base station 110 were to calculate beam blocking detection parameters for multiple UEs 120 (e.g., all UEs 120 served by the base station 110). In this way, latency may be reduced, resources of the base station 110 may be conserved, communication errors may be reduced (e.g., as a result of performing a corrective action), system performance may be improved, and/or the like.

In some aspects, rather than the UE 120 reporting one or more beam blocking parameters, the base station 110 may calculate one or more beam blocking parameters. For example, the base station 110 may transmit an SRS configuration (e.g., in a configuration message) that indicates an SRS resource set for transmission of SRSs. In some aspects, the SRS resource set may have a usage associated with beam management and/or associated with detecting beam blocking. The UE 120 may transmit SRSs in the configured SRS resource set, and the base station 10 may measure SRSs in the configured SRS resource set. The base station 110 may calculate one or more values corresponding to one or more parameters associated with detecting beam blocking (described in more detail below in connection with FIG. 6) based at least in part on measuring the SRSs. In this way, the base station 110 may enable resources of the UE 120 (e.g., memory resources, processing resources, and/or the like) to be conserved because the calculations are performed at the base station 110 rather than the UE 120.

In some aspects, the base station 110 may configure a first set of UEs 120 (e.g., premium UEs, high tier UEs, UEs with a higher capability) to report beam blocking parameters, and may configure a second set of UEs 120 (e.g., reduced capability UEs, low tier UEs, UEs with a lower capability, NR Lite UEs, and/or the like) to transmit SRSs that are used by the base station 110 to calculate the beam blocking parameters. In this way, the base station 110 may offload complex processing to UEs 120 that are equipped to handle such processing and may perform the complex processing for UEs 120 that are not equipped to handle such processing.

As indicated above, FIG. 5 is provided as an example. Other examples may differ from what is described with respect to FIG. 5.

Figure 6:
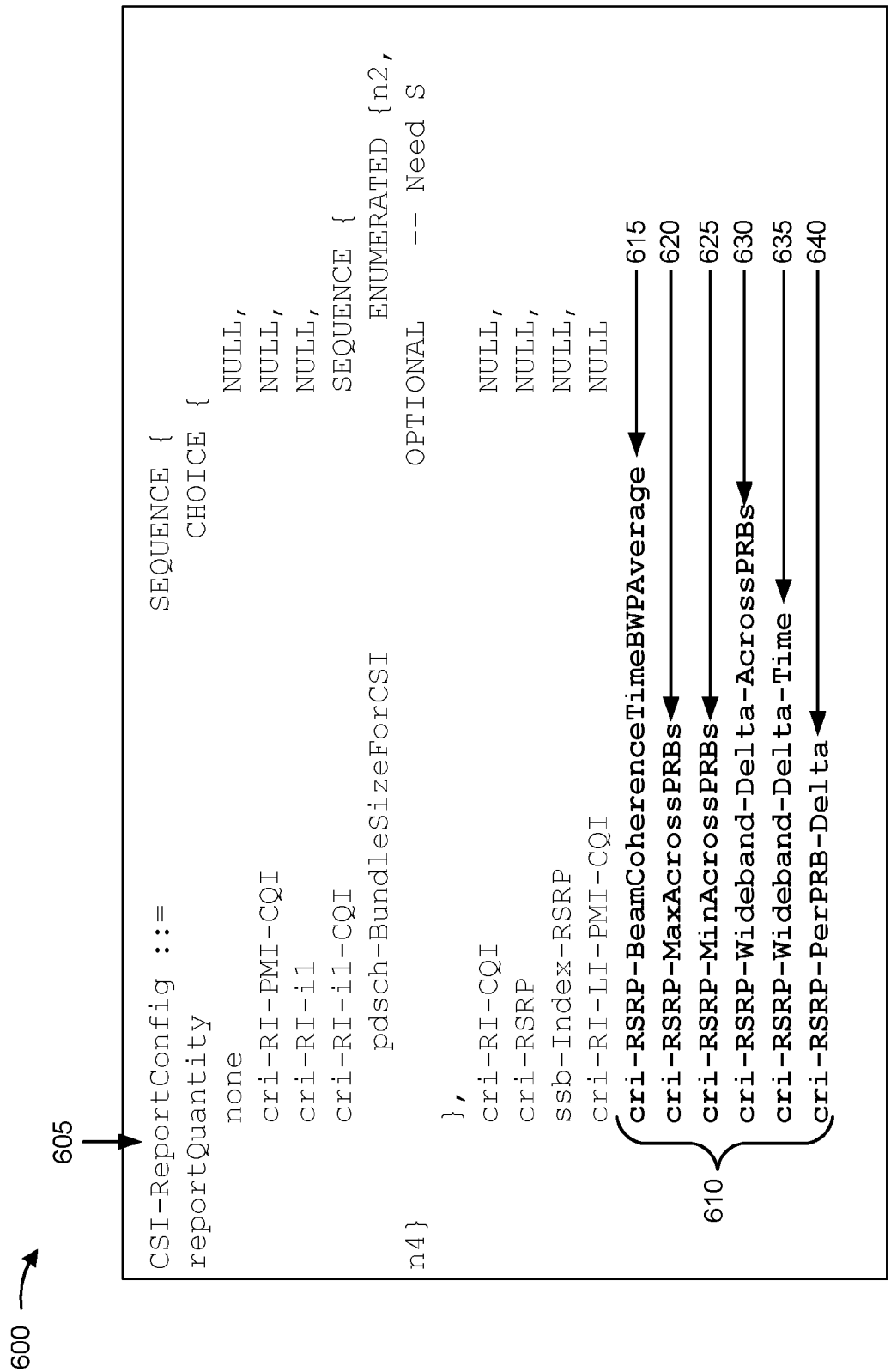

FIG. 6 is a diagram illustrating an example 600 associated with beam blocking detection and reporting, in accordance with the present disclosure. FIG. 6 shows an example CSI report configuration 605 that indicates a set of beam blocking detection parameters 610 that can be configured for a UE 120 to report to a base station 110.

In some aspects, the set of beam blocking detection parameters 610 includes a first parameter 615 (shown as cri-RSRP-BeamCoherenceTimeBWPAverage) that indicates an average RSRP measured (e.g., using CSI-RSs) across a bandwidth part (BWP) configured for the UE 120 during a time period during which a beam is blocked (sometimes referred to as a beam coherence time). To calculate a value for the first parameter 615, the UE 120 may determine a time period during which a beam (e.g., an active beam between the UE 120 and the base station 110) is blocked. For example, the UE 120 may measure RSRP over time or at multiple time instances. If the UE 120 determines that the measured RSRP for a beam satisfies a threshold (e.g., is greater than a threshold, such as a noise floor) for a first time period and fails to satisfy the threshold for a second time period that follows the first time period, then the UE 120 may determine that the beam is blocked during the second time period. Additionally, or alternatively, if the UE 120 determines that the measured RSRP for a beam satisfies a threshold (e.g., is greater than a threshold, such as a noise floor) for a first time period, fails to satisfy the threshold for a second time period that follows the first time period, and satisfies the threshold for a third time period that follows the second time period, then the UE 120 may determine that the beam was blocked during the second time period. The UE 120 may measure and/or calculate an average RSRP (e.g., for the beam) across a BWP configured for the UE 120 (e.g., across all physical resource blocks (PRBs) in the BWP configured for the UE 120) for the time period during which the beam was blocked, and may report this average RSRP value.

Additionally, or alternatively, the set of beam blocking detection parameters 610 may include a second parameter 620 (shown as cri-RSRP-MaxAcrossPRBs) that indicates a maximum RSRP measured (e.g., using CSI-RSs) across all PRBs for which the UE 120 is configured to measure CSI-RSs. To calculate a value for the second parameter 620, the UE 120 may measure and/or calculate RSRP on a BWP configured for the UE 120 (e.g., across all PRBs in the BWP configured for the UE 120), and may determine a maximum RSRP measured across the BWP (e.g., for a particular PRB associated with the maximum RSRP). The UE 120 may report this maximum RSRP value.

Additionally, or alternatively, the set of beam blocking detection parameters 610 may include a third parameter 625 (shown as cri-RSRP-MinAcrossPRBs) that indicates a minimum RSRP measured (e.g., using CSI-RSs) across all PRBs for which the UE 120 is configured to measure CSI-RSs. To calculate a value for the third parameter 625, the UE 120 may measure and/or calculate RSRP on a BWP configured for the UE 120 (e.g., across all PRBs in the BWP configured for the UE 120), and may determine a minimum RSRP measured across the BWP (e.g., for a particular PRB associated with the minimum RSRP). The UE 120 may report this minimum RSRP value.

Additionally, or alternatively, the set of beam blocking detection parameters 610 may include a fourth parameter 630 (shown as cri-RSRP-Wideband-Delta-AcrossPRBs) that indicates a difference among RSRP measurements for at least two CSI-RSs configured for the UE 120. In some aspects, the difference to be reported is a difference between a maximum RSRP measured across all PRBs for which the UE 120 is configured to measure CSI-RSs (e.g., cri-RSRP-MaxAcrossPRBs) and a minimum RSRP measured across all PRBs for which the UE is configured to measure CSI-RSs (e.g., cri-RSRP-MinAcrossPRBs). In some aspects, the difference to be reported is a difference between RSRP measurements for one or more pairs of PRBs for which the UE 120 is configured to measure CSI-RSs (e.g., for a single pair of PRBs, for multiple pairs of PRBs, for pairs of PRBs indicated in the configuration, for all pairs of PRBs for which measurement is configured for the UE 120, and/or the like). In some aspects, the difference to be reported is a standard deviation among RSRP measurements for a set of PRBs for which the UE 120 is configured to measure CSI-RSs (e.g., all PRBs for which the UE 120 is configured to measure CSI-RSs). In some aspects, the CSI report configuration may indicate that the UE 120 is to report one of these difference values, multiple of these difference values, or all of these difference values.

Additionally, or alternatively, the set of beam blocking detection parameters 610 may include a fifth parameter 635 (shown as cri-RSRP-Wideband-Delta-Time) that indicates a difference between wideband RSRP measurements (e.g., using CSI-RSs) at different times. For example, the UE 120 may measure wideband RSRP (e.g., using CSI-RSs) at a first time (e.g., a first slot, a first measurement occasion, $t_0$, and/or the like), may measure wideband RSRP (e.g., using CSI-RSs) at a second time (e.g., a second slot, a second measurement occasion, $t_1$, and/or the like), and may calculate a difference between the wideband RSRP measured at the first time and the wideband RSRP measured at the second time (e.g., $t_0-t_1$ or $t_1-t_0$). The UE 120 may report the calculated difference.

Additionally, or alternatively, the set of beam blocking detection parameters 610 may include a sixth parameter 640 (shown as cri-RSRP-PerPRB-Delta) that indicates a difference among RSRP measurements that are measured (e.g., using CSI-RSs) at different times for a PRB. For example, the UE 120 may measure RSRP (e.g., using CSI-RSs) for a PRB at a first time (e.g., a first slot, a first measurement occasion, $t_0$, and/or the like), may measure RSRP (e.g., using CSI-RSs) for the PRB at a second time (e.g., a second slot, a second measurement occasion, $t_1$, and/or the like), and may calculate a difference between the RSRP measured for the PRB at the first time and the RSRP measured for the PRB at the second time (e.g., $t_0-t_1$ or $t_1-t_0$). The UE 120 may report the calculated difference. The reported difference may be for a single PRB or for each PRB in a set of PRBs. The set of PRBs may be configured in the CSI report configuration or may include all of PRBs for which measurement is configured for the UE 120 (e.g., all PRBs in a BWP configured for the UE 120).

As indicated above, FIG. 6 is provided as an example. Other examples may differ from what is described with respect to FIG. 6.

FIG. 7 is a diagram illustrating an example 700 associated with beam blocking detection and reporting, in accordance with the present disclosure. FIG. 7 shows an example CSI report configuration 705 that indicates a set of beam blocking detection parameters 710 that can be configured for a UE 120 to report to a base station 110.

In some aspects, the set of beam blocking detection parameters 710 includes a first parameter 715 (shown as ssb-Index-RSRP-BeamCoherenceTimeBWPAverage) that indicates an average RSRP measured (e.g., using SSBs) across a BWP configured for the UE 120 during a time period during which a beam is blocked (sometimes referred to as a beam coherence time). To calculate a value for the first parameter 715, the UE 120 may determine a time period during which a beam (e.g., an active beam between the UE 120 and the base station 110) is blocked., as described above in connection with FIG. 6. In example 600, the UE 120 may measure CSI-RSs to determine the average RSRP, while in example 700, the UE 120 may measure SSBs to determine the average RSRP. In some aspects, the UE 120 may measure both CSI-RSs and SSBs to determine the average RSRP.

Additionally, or alternatively, the set of beam blocking detection parameters 710 may include a second parameter 720 (shown as ssb-Index-RSRP-MaxAcrossPRBs) that indicates a maximum RSRP measured (e.g., using SSBs) across all PRBs for which the UE 120 is configured to measure SSBs. To calculate a value for the second parameter 720, the UE 120 may measure and/or calculate RSRP on a BWP configured for the UE 120 (e.g., across all PRBs in the BWP configured for the UE 120), and may determine a maximum RSRP measured across the BWP (e.g., for a particular PRB associated with the maximum RSRP). The UE 120 may report this maximum RSRP value.

Additionally, or alternatively, the set of beam blocking detection parameters 710 may include a third parameter 725 (shown as ssb-Index-MinAcrossPRBs) that indicates a minimum RSRP measured across all PRBs for which the UE 120 is configured to measure SSBs. To calculate a value for the third parameter 725, the UE 120 may measure and/or calculate RSRP (e.g., using SSBs) on a BWP configured for the UE 120 (e.g., across all PRBs in the BWP configured for the UE 120), and may determine a minimum RSRP measured across the BWP (e.g., for a particular PRB associated with the minimum RSRP). The UE 120 may report this minimum RSRP value.

Additionally, or alternatively, the set of beam blocking detection parameters 710 may include a fourth parameter 730 (shown as ssb-Index-RSRP-Wideband-Delta-AcrossPRBs) that indicates a difference among RSRP measurements for at least two SSBs configured for the UE 120. In some aspects, the difference to be reported is a difference between a maximum RSRP measured across all PRBs for which the UE 120 is configured to measure SSBs (e.g., ssb-Index-RSRP-MaxAcrossPRBs) and a minimum RSRP measured across all PRBs for which the UE is configured to measure SSBs (e.g., ssb-Index-RSRP-MinAcrossPRBs). In some aspects, the difference to be reported is a difference between RSRP measurements for one or more pairs of PRBs for which the UE 120 is configured to measure SSBs (e.g., for a single pair of PRBs, for multiple pairs of PRBs, for pairs of PRBs indicated in the configuration, for all pairs of PRBs for which measurement is configured for the UE 120, and/or the like). In some aspects, the difference to be reported is a standard deviation among RSRP measurements for a set of PRBs for which the UE 120 is configured to measure SSBs (e.g., all PRBs for which the UE 120 is configured to measure SSBs). In some aspects, the CSI report configuration may indicate that the UE 120 is to report one of these difference values, multiple of these difference values, or all of these difference values.

Additionally, or alternatively, the set of beam blocking detection parameters 710 may include a fifth parameter 735 (shown as ssb-Index-RSRP-Wideband-Delta-Time) that indicates a difference between wideband RSRP measurements (e.g., using SSBs) at different times. For example, the UE 120 may measure wideband RSRP (e.g., using SSBs) at a first time (e.g., a first slot, a first measurement occasion, $t_0$, and/or the like), may measure wideband RSRP (e.g., using SSBs) at a second time (e.g., a second slot, a second measurement occasion, $t_1$, and/or the like), and may calculate a difference between the wideband RSRP measured at the first time and the wideband RSRP measured at the second time (e.g., $t_0 - t_1$ or $t_1 - t_0$). The UE 120 may report the calculated difference.

Additionally, or alternatively, the set of beam blocking detection parameters 710 may include a sixth parameter 740 (shown as ssb-Index-RSRP-PerPRB-Delta) that indicates a difference among RSRP measurements that are measured (e.g., using SSBs) at different times for a PRB. For example, the UE 120 may measure RSRP (e.g., using SSBs) for a PRB at a first time (e.g., a first slot, a first measurement occasion, $t_0$, and/or the like), may measure RSRP (e.g., using SSBs) for the PRB at a second time (e.g., a second slot, a second measurement occasion, $t_1$, and/or the like), and may calculate a difference between the RSRP measured for the PRB at the first time and the RSRP measured for the PRB at the second time (e.g., $t_0 - t_1$ or $t_1 - t_0$). The UE 120 may report the calculated difference. The reported difference may be for a single PRB or for each PRB in a set of PRBs. The set of PRBs may be configured in the CSI report configuration or may include all of PRBs for which measurement is configured for the UE 120 (e.g., all PRBs in a BWP configured for the UE 120).

In some aspects, the UE 120 may calculate one or more beam blocking parameters described in connection with FIG. 6 and/or FIG. 7 using a combination of CSI-RS measurements and SSB measurements.

As indicated above, FIG. 7 is provided as an example. Other examples may differ from what is described with respect to FIG. 7.

Figure 8:
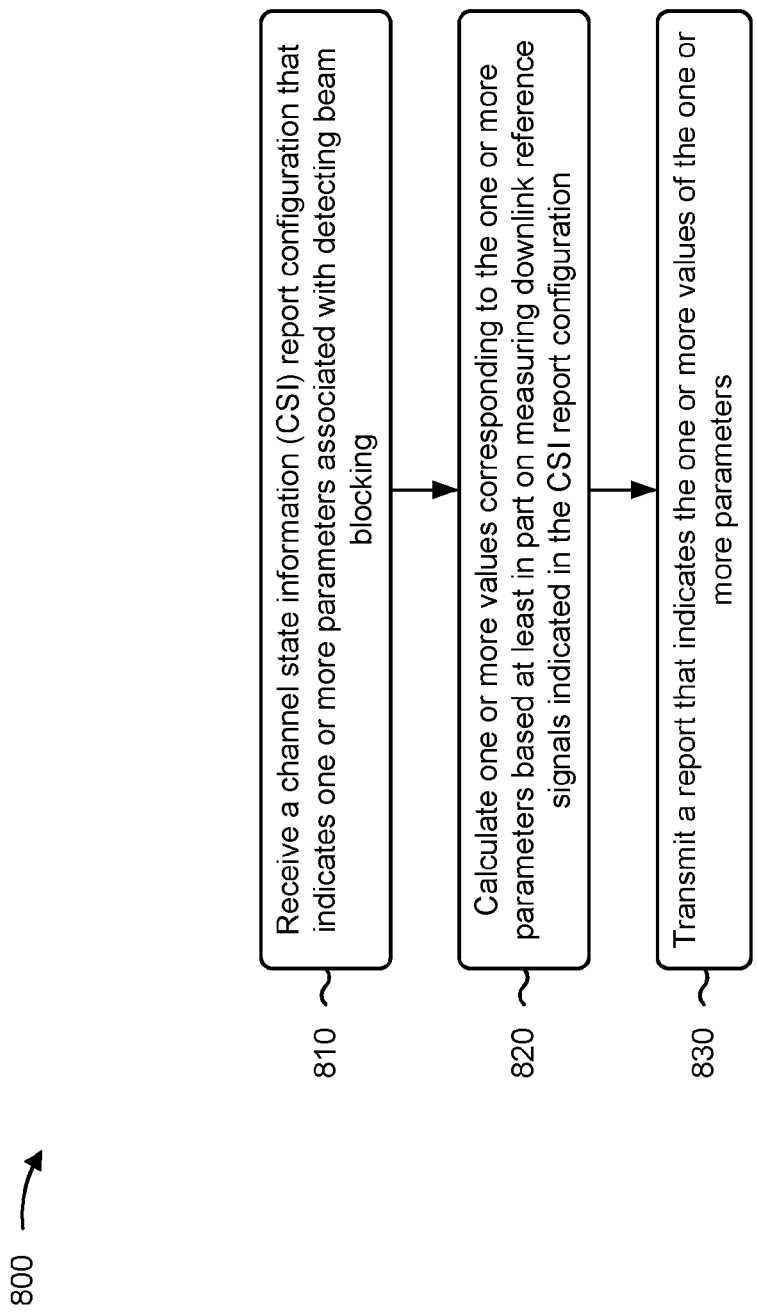
FIGS. 8-10 are diagrams illustrating example processes associated with beam blocking detection and reporting, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with beam blocking detection and reporting.

As shown in FIG. 8, in some aspects, process 800 may include receiving a CSI report configuration that indicates one or more parameters associated with detecting beam blocking (block 810). For example, the UE (e.g., using receive processor 258, controller/processor 280, memory 282, and/or the like) may receive a CSI report configuration that indicates one or more parameters associated with detecting beam blocking, as described above.

As further shown in FIG. 8, in some aspects, process 800 may include calculating one or more values corresponding to the one or more parameters based at least in part on measuring downlink reference signals indicated in the CSI report configuration (block 820). For example, the UE (e.g., using receive processor 258, transmit processor 264, controller/processor 280, memory 282, and/or the like) may calculate one or more values corresponding to the one or more parameters based at least in part on measuring downlink reference signals indicated in the CSI report configuration, as described above.

As further shown in FIG. 8, in some aspects, process 800 may include transmitting a report that indicates the one or more values of the one or more parameters (block 830). For example, the UE (e.g., using transmit processor 264, controller/processor 280, memory 282, and/or the like) may transmit a report that indicates the one or more values of the one or more parameters, as described above.

Process 800 may include additional aspects, such as any single aspect or any combination of aspects described below and/or in connection with one or more other processes described elsewhere herein.

In a first aspect, the one or more parameters include a parameter that indicates an average reference signal received power measured across a bandwidth part configured for the UE during a time period during which a beam is blocked.

In a second aspect, alone or in combination with the first aspect, the one or more parameters include a parameter that indicates a maximum reference signal received power measured across all physical resource blocks for which the UE is configured to measure the downlink reference signals In a third aspect, alone or in combination with one or more of the first and second aspects, the one or more parameters include a parameter that indicates a minimum reference signal received power measured across all physical resource blocks for which the UE is configured to measure the downlink reference signals In a fourth aspect, alone or in combination with one or more of the first through third aspects, the one or more parameters include a parameter that indicates a difference among reference signal received power measurements for at least two of the downlink reference signals.

In a fifth aspect, alone or in combination with one or more of the first through fourth aspects, the difference is at least one of: a difference between a maximum reference signal received power measured across all physical resource blocks for which the UE is configured to measure the downlink reference signals and a minimum reference signal received power measured across all physical resource blocks for which the UE is configured to measure the downlink reference signals, a difference between reference signal received power measurements for one or more pairs of physical resource blocks for which the UE is configured to measure downlink reference signals, a standard deviation among reference signal received power measurements for a set of physical resource blocks for which the UE is configured to measure downlink reference signals, or a combination thereof.

In a sixth aspect, alone or in combination with one or more of the first through fifth aspects, the one or more parameters include a parameter that indicates a difference among wideband reference signal received power measurements at different times.

In a seventh aspect, alone or in combination with one or more of the first through sixth aspects, the one or more parameters include a parameter that indicates a difference among reference signal received power measurements that are measured at different times for a physical resource block.

In an eighth aspect, alone or in combination with one or more of the first through seventh aspects, the one or more parameters are configured in association with a CSI-RS resource indicator for wideband CSI reporting or in association with a synchronization signal block index.

In a ninth aspect, alone or in combination with one or more of the first through eighth aspects, the one or more values of the one or more parameters are transmitted in a CSI report, a report associated with a negative acknowledgement indication, or a report associated with requesting a new beam.

In a tenth aspect, alone or in combination with one or more of the first through ninth aspects, the one or more values of the one or more parameters are transmitted using uplink beam sweeping.

In an eleventh aspect, alone or in combination with one or more of the first through tenth aspects, the downlink reference signals include at least one of CSI-RSs or SSBs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
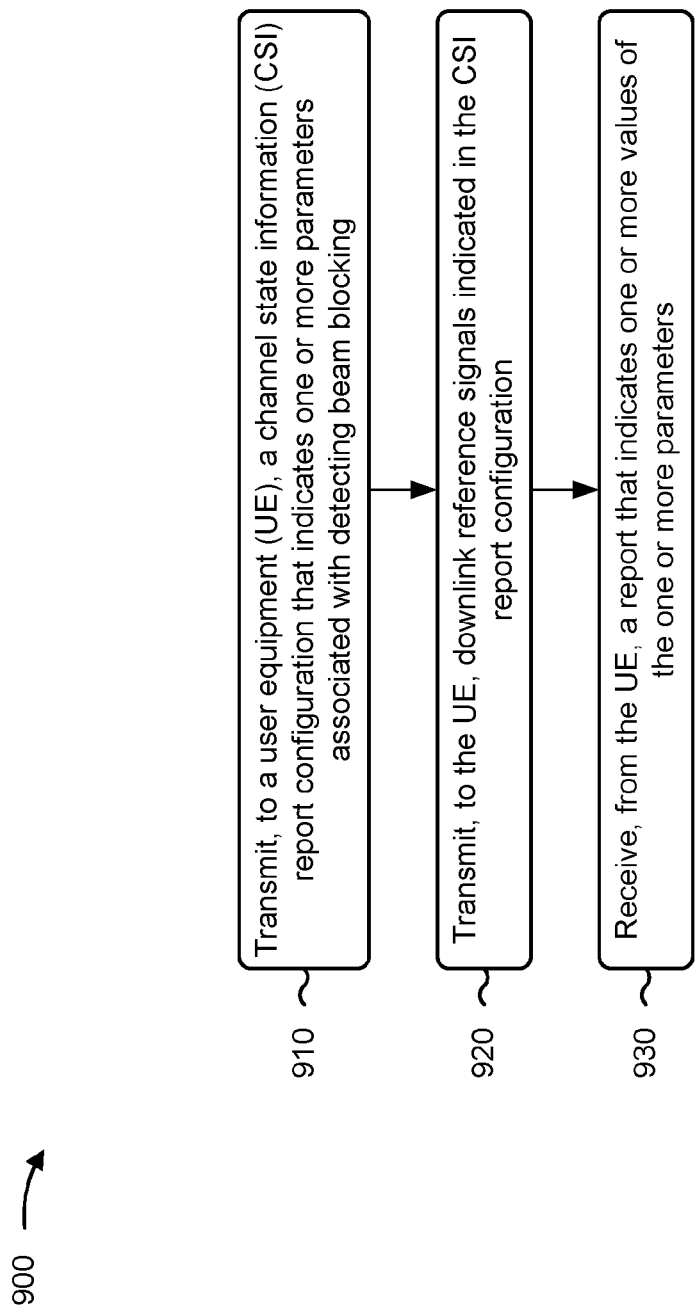

FIG. 9 is a diagram illustrating an example process 900 performed, for example, by a base station, in accordance with the present disclosure. Example process 900 is an example where the base station (e.g., base station 110 and/or the like) performs operations associated with beam blocking detection and reporting.

As shown in FIG. 9, in some aspects, process 900 may include transmitting, to a UE, a CSI report configuration that indicates one or more parameters associated with detecting beam blocking (block 910). For example, the base station (e.g., using transmit processor 220, controller/processor 240, memory 242, and/or the like) may transmit, to a UE, a CSI report configuration that indicates one or more parameters associated with detecting beam blocking, as described above.

As further shown in FIG. 9, in some aspects, process 900 may include transmitting, to the UE, downlink reference signals indicated in the CSI report configuration (block 920). For example, the base station (e.g., using transmit processor 220, controller/processor 240, memory 242, and/or the like) may transmit, to the UE, downlink reference signals indicated in the CSI report configuration, as described above.

As further shown in FIG. 9, in some aspects, process 900 may include receiving, from the UE, a report that indicates one or more values of the one or more parameters (block 930). For example, the base station (e.g., using receive processor 238, controller/processor 240, memory 242, and/or the like) may receive, from the UE, a report that indicates one or more values of the one or more parameters, as described above.

Process 900 may include additional aspects, such as any single aspect or any combination of aspects described below and/or in connection with one or more other processes described elsewhere herein.

In a first aspect, process 900 includes determining whether a beam is blocked based at least in part on the report; and selectively is identifying a new beam for communication with the UE or performing radio link adaptation on an active beam for the UE based at least in part on determining whether the beam is blocked.

In a second aspect, alone or in combination with the first aspect, process 900 includes determining that a beam is blocked, selecting a new beam, performing a beam management procedure, or retransmitting a communication based at least in part on the report.

In a third aspect, alone or in combination with one or more of the first and second aspects, the one or more parameters include a parameter that indicates an average reference signal received power measured across a bandwidth part configured for the UE during a time period during which a beam is blocked.

In a fourth aspect, alone or in combination with one or more of the first through third aspects, the one or more parameters include a parameter that indicates a maximum reference signal received power measured across all physical resource blocks for which the UE is configured to measure the downlink reference signals.

In a fifth aspect, alone or in combination with one or more of the first through fourth aspects, the one or more parameters include a parameter that indicates a minimum reference signal received power measured across all physical resource blocks for which the UE is configured to measure the downlink reference signals.

In a sixth aspect, alone or in combination with one or more of the first through fifth aspects, the one or more parameters include a parameter that indicates a difference among reference signal received power measurements for at least two of the downlink reference signals.

In a seventh aspect, alone or in combination with one or more of the first through sixth aspects, the difference is at least one of: a difference between a maximum reference signal received power measured across all physical resource blocks for which the UE is configured to measure the downlink reference signals and a minimum reference signal received power measured across all physical resource blocks for which the UE is configured to measure the downlink reference signals, a difference between reference signal received power measurements for one or more pairs of physical resource blocks for which the UE is configured to measure downlink reference signals, a standard deviation among reference signal received power measurements for a set of physical resource blocks for which the UE is configured to measure downlink reference signals, or a combination thereof.

In an eighth aspect, alone or in combination with one or more of the first through seventh aspects, the one or more parameters include a parameter that indicates a difference among wideband reference signal received power measurements at different times.

In a ninth aspect, alone or in combination with one or more of the first through eighth aspects, the one or more parameters include a parameter that indicates a difference among reference signal received power measurements that are measured at different times for a physical resource block.

In a tenth aspect, alone or in combination with one or more of the first through ninth aspects, the one or more parameters are configured in association with a CSI-RS resource indicator for wideband CSI reporting or in association with a synchronization signal block index.

In an eleventh aspect, alone or in combination with one or more of the first through tenth aspects, the one or more values of the one or more parameters are received in a CSI report, a report associated with a negative acknowledgement indication, or a report associated with requesting a new beam.

In a twelfth aspect, alone or in combination with one or more of the first through eleventh aspects, the one or more values of the one or more parameters are received using uplink beam sweeping.

In a thirteenth aspect, alone or in combination with one or more of the first through twelfth aspects, the downlink reference signals include at least one of CSI-RSs or SSBs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
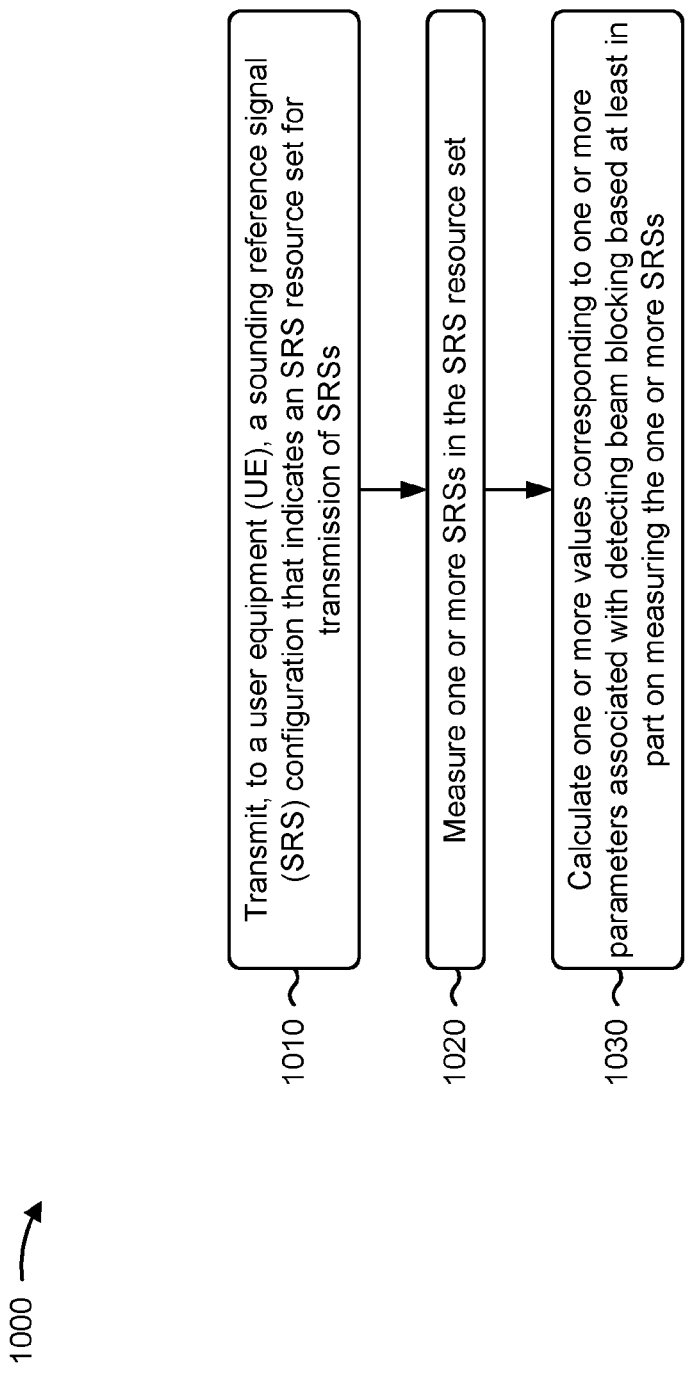

FIG. 10 is a diagram illustrating an example process 1000 performed, for example, by a base station, in accordance with the present disclosure. Example process 1000 is an example where the base station (e.g., base station 110 and/or the like) performs operations associated with beam blocking detection and reporting.

As shown in FIG. 10, in some aspects, process 1000 may include transmitting, to a UE, an SRS configuration that indicates an SRS resource set for transmission of SRSs (block 1010). For example, the base station (e.g., using transmit processor 220, controller/processor 240, memory 242, and/or the like) may transmit, to a UE, an SRS configuration that indicates an SRS resource set for transmission of SRSs, as described above.

As further shown in FIG. 10, in some aspects, process 1000 may include measuring one or more SRSs in the SRS resource set (block 1020). For example, the base station (e.g., using receive processor 238, controller/processor 240, memory 242, and/or the like) may measure one or more SRSs in the SRS resource set, as described above.

As further shown in FIG. 10, in some aspects, process 1000 may include calculating one or more values corresponding to one or more parameters associated with detecting beam blocking based at least in part on measuring the one or more SRSs (block 1030). For example, the base station (e.g., using receive processor 238, controller/processor 240, memory 242, and/or the like) may calculate one or more values corresponding to one or more parameters associated with detecting beam blocking based at least in part on measuring the one or more SRSs, as described above.

Process 1000 may include additional aspects, such as any single aspect or any combination of aspects described below and/or in connection with one or more other processes described elsewhere herein.

In a first aspect, process 1000 includes determining whether a beam is blocked based at least in part on the one or more values; and selectively is identifying a new beam for communication with the UE or performing radio link adaptation on an active beam for the UE based at least in part on determining whether the beam is blocked.

In a second aspect, alone or in combination with the first aspect, process 1000 includes determining that a beam is blocked, selecting a new beam, performing a beam management procedure, or retransmitting a communication based at least in part on the one or more values.

In a third aspect, alone or in combination with one or more of the first and second aspects, the one or more parameters include a parameter that indicates an average reference signal received power measured across a bandwidth part configured for the UE during a time period during which a beam is blocked.

In a fourth aspect, alone or in combination with one or more of the first through third aspects, the one or more parameters include a parameter that indicates a maximum reference signal received power measured across all physical resource blocks included in the SRS resource set.

In a fifth aspect, alone or in combination with one or more of the first through fourth aspects, the one or more parameters include a parameter that indicates a minimum reference signal received power measured across all physical resource blocks included in the SRS resource set.

In a sixth aspect, alone or in combination with one or more of the first through fifth aspects, the one or more parameters include a parameter that indicates a difference among reference signal received power measurements for at least two of the one or more SRSs.

In a seventh aspect, alone or in combination with one or more of the first through sixth aspects, the difference is at least one of: a difference between a maximum reference signal received power measured across all physical resource blocks included in the SRS resource set and a minimum reference signal received power measured across all physical resource blocks included in the SRS resource set, a difference between reference signal received power measurements for one or more pairs of physical resource blocks included in the SRS resource set, a standard deviation among reference signal received power measurements for a set of physical resource blocks included in the SRS resource set, or a combination thereof.

In an eighth aspect, alone or in combination with one or more of the first through seventh aspects, the one or more parameters include a parameter that indicates a difference among wideband reference signal received power measurements at different times.

In a ninth aspect, alone or in combination with one or more of the first through eighth aspects, the one or more parameters include a parameter that indicates a difference among reference signal received power measurements that are measured at different times for a physical resource block.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving a channel state information (CSI) report configuration that indicates one or more parameters associated with detecting beam blocking; calculating one or more values corresponding to the one or more parameters based at least in part on measuring downlink reference signals indicated in the CSI report configuration; and transmitting a report that indicates the one or more values of the one or more parameters.

Aspect 2: The method of Aspect 1, wherein the one or more parameters include a parameter that indicates an average reference signal received power measured across a bandwidth part configured for the UE during a time period during which a beam is blocked.

Aspect 3: The method of any of Aspects 1-2, wherein the one or more parameters include a parameter that indicates a maximum reference signal received power measured across all physical resource blocks for which the UE is configured to measure the downlink reference signals.

Aspect 4: The method of any of Aspects 1-3, wherein the one or more parameters include a parameter that indicates a minimum reference signal received power measured across all physical resource blocks for which the UE is configured to measure the downlink reference signals.

Aspect 5: The method of any of Aspects 1-4, wherein the one or more parameters include a parameter that indicates a difference among reference signal received power measurements for at least two of the downlink reference signals.

Aspect 6: The method of Aspect 5, wherein the difference is at least one of: a difference between a maximum reference signal received power measured across all physical resource blocks for which the UE is configured to measure the downlink reference signals and a minimum reference signal received power measured across all physical resource blocks for which the UE is configured to measure the downlink reference signals, a difference between reference signal received power measurements for one or more pairs of physical resource blocks for which the UE is configured to measure downlink reference signals, a standard deviation among reference signal received power measurements for a set of physical resource blocks for which the UE is configured to measure downlink reference signals, or a combination thereof.

Aspect 7: The method of any of Aspects 1-6, wherein the one or more parameters include a parameter that indicates a difference among wideband reference signal received power measurements at different times.

Aspect 8: The method of any of Aspects 1-7, wherein the one or more parameters include a parameter that indicates a difference among reference signal received power measurements that are measured at different times for a physical resource block.

Aspect 9: The method of any of Aspects 1-8, wherein the one or more parameters are configured in association with a CSI-RS resource indicator for wideband CSI reporting or in association with a synchronization signal block index.

Aspect 10: The method of any of Aspects 1-9, wherein the one or more values of the one or more parameters are transmitted in a CSI report, a report associated with a negative acknowledgement indication, or a report associated with requesting a new beam.

Aspect 11: The method of any of Aspects 1-10, wherein the one or more values of the one or more parameters are transmitted using uplink beam sweeping.

Aspect 12: The method of any of Aspects 1-11, wherein the downlink reference signals include at least one of CSI reference signals (CSI-RSs) or synchronization signal blocks (SSBs).

Aspect 13: A method of wireless communication performed by a base station, comprising: transmitting, to a user equipment (UE), a channel state information (CSI) report configuration that indicates one or more parameters associated with detecting beam blocking; transmitting, to the UE, downlink reference signals indicated in the CSI report configuration; and receiving, from the UE, a report that indicates one or more values of the one or more parameters.

Aspect 14: The method of Aspect 13, further comprising: determining whether a beam is blocked based at least in part on the report; and selectively identifying a new beam for communication with the UE or performing radio link adaptation on an active beam for the UE based at least in part on determining whether the beam is blocked.

Aspect 15: The method of any of Aspects 13-14, further comprising determining that a beam is blocked, selecting a new beam, performing a beam management procedure, or retransmitting a communication based at least in part on the report.

Aspect 16: The method of any of Aspects 13-15, wherein the one or more parameters include a parameter that indicates an average reference signal received power measured across a bandwidth part configured for the UE during a time period during which a beam is blocked.

Aspect 17: The method of any of Aspects 13-16, wherein the one or more parameters include a parameter that indicates a maximum reference signal received power measured across all physical resource blocks for which the UE is configured to measure the downlink reference signals.

Aspect 18: The method of any of Aspects 13-17, wherein the one or more parameters include a parameter that indicates a minimum reference signal received power measured across all physical resource blocks for which the UE is configured to measure the downlink reference signals.

Aspect 19: The method of any of Aspects 13-18, wherein the one or more parameters include a parameter that indicates a difference among reference signal received power measurements for at least two of the downlink reference signals.

Aspect 20: The method of Aspect 19, wherein the difference is at least one of: a difference between a maximum reference signal received power measured across all physical resource blocks for which the UE is configured to measure the downlink reference signals and a minimum reference signal received power measured across all physical resource blocks for which the UE is configured to measure the downlink reference signals, a difference between reference signal received power measurements for one or more pairs of physical resource blocks for which the UE is configured to measure downlink reference signals, a standard deviation among reference signal received power measurements for a set of physical resource blocks for which the UE is configured to measure downlink reference signals, or a combination thereof.

Aspect 21: The method of any of Aspects 13-20, wherein the one or more parameters include a parameter that indicates a difference among wideband reference signal received power measurements at different times.

Aspect 22: The method of any of Aspects 13-21, wherein the one or more parameters include a parameter that indicates a difference among reference signal received power measurements that are measured at different times for a physical resource block.

Aspect 23: The method of any of Aspects 13-22, wherein the one or more parameters are configured in association with a CSI-RS resource indicator for wideband CSI reporting or in association with a synchronization signal block index.

Aspect 24: The method of any of Aspects 13-23, wherein the one or more values of the one or more parameters are received in a CSI report, a report associated with a negative acknowledgement indication, or a report associated with requesting a new beam.

Aspect 25: The method of any of Aspects 13-24, wherein the one or more values of the one or more parameters are received using uplink beam sweeping.

Aspect 26: The method of any of Aspects 13-25, wherein the downlink reference signals include at least one of CSI reference signals (CSI-RSs) or synchronization signal blocks (SSBs).

Aspect 27: A method of wireless communication performed by a base station, comprising: transmitting, to a user equipment (UE), a sounding reference signal (SRS) configuration that indicates an SRS resource set for transmission of SRSs; measuring one or more SRSs in the SRS resource set; and calculating one or more values corresponding to one or more parameters associated with detecting beam blocking based at least in part on measuring the one or more SRSs.

Aspect 28: The method of Aspect 27, further comprising: determining whether a beam is blocked based at least in part on the one or more values; and selectively identifying a new beam for communication with the UE or performing radio link adaptation on an active beam for the UE based at least in part on determining whether the beam is blocked.

Aspect 29: The method of any of Aspects 27-28, further comprising determining that a beam is blocked, selecting a new beam, performing a beam management procedure, or retransmitting a communication based at least in part on the one or more values.

Aspect 30: The method of any of Aspects 27-29, wherein the one or more parameters include a parameter that indicates an average reference signal received power measured across a bandwidth part configured for the UE during a time period during which a beam is blocked.

Aspect 31: The method of any of Aspects 27-30, wherein the one or more parameters include a parameter that indicates a maximum reference signal received power measured across all physical resource blocks included in the SRS resource set.

Aspect 32: The method of any of Aspects 27-31, wherein the one or more parameters include a parameter that indicates a minimum reference signal received power measured across all physical resource blocks included in the SRS resource set.

Aspect 33: The method of any of Aspects 27-32, wherein the one or more parameters include a parameter that indicates a difference among reference signal received power measurements for at least two of the one or more SRSs.

Aspect 34: The method of Aspect 33, wherein the difference is at least one of: a difference between a maximum reference signal received power measured across all physical resource blocks included in the SRS resource set and a minimum reference signal received power measured across all physical resource blocks included in the SRS resource set, a difference between reference signal received power measurements for one or more pairs of physical resource blocks included in the SRS resource set, a standard deviation among reference signal received power measurements for a set of physical resource blocks included in the SRS resource set, or a combination thereof.

Aspect 35: The method of any of Aspects 27-34, wherein the one or more parameters include a parameter that indicates a difference among wideband reference signal received power measurements at different times.

Aspect 36: The method of any of Aspects 27-35, wherein the one or more parameters include a parameter that indicates a difference among reference signal received power measurements that are measured at different times for a physical resource block.

Aspect 37: An apparatus for wireless communication at a device, comprising a processor; memory coupled with the processor; and instructions stored in the memory and executable by the processor to cause the apparatus to perform the method of one or more of Aspects 1-12.

Aspect 38: A device for wireless communication, comprising a memory and one or more processors coupled to the memory, the one or more processors configured to perform the method of one or more of Aspects 1-12.

Aspect 39: An apparatus for wireless communication, comprising at least one means for performing the method of one or more of Aspects 1-12.

Aspect 40: A non-transitory computer-readable medium storing code for wireless communication, the code comprising instructions executable by a processor to perform the method of one or more of Aspects 1-12.

Aspect 41: A non-transitory computer-readable medium storing a set of instructions for wireless communication, the set of instructions comprising one or more instructions that, when executed by one or more processors of a device, cause the device to perform the method of one or more of Aspects 1-12.

Aspect 42: An apparatus for wireless communication at a device, comprising a processor; memory coupled with the processor; and instructions stored in the memory and executable by the processor to cause the apparatus to perform the method of one or more of Aspects 13-26.

Aspect 43: A device for wireless communication, comprising a memory and one or more processors coupled to the memory, the one or more processors configured to perform the method of one or more of Aspects 13-26.

Aspect 44: An apparatus for wireless communication, comprising at least one means for performing the method of one or more of Aspects 13-26.

Aspect 45: A non-transitory computer-readable medium storing code for wireless communication, the code comprising instructions executable by a processor to perform the method of one or more of Aspects 13-26.

Aspect 46: A non-transitory computer-readable medium storing a set of instructions for wireless communication, the set of instructions comprising one or more instructions that, when executed by one or more processors of a device, cause the device to perform the method of one or more of Aspects 13-26.

Aspect 47: An apparatus for wireless communication at a device, comprising a processor; memory coupled with the processor; and instructions stored in the memory and executable by the processor to cause the apparatus to perform the method of one or more of Aspects 27-36.

Aspect 48: A device for wireless communication, comprising a memory and one or more processors coupled to the memory, the one or more processors configured to perform the method of one or more of Aspects 27-36.

Aspect 49: An apparatus for wireless communication, comprising at least one means for performing the method of one or more of Aspects 27-36.

Aspect 50: A non-transitory computer-readable medium storing code for wireless communication, the code comprising instructions executable by a processor to perform the method of one or more of Aspects 27-36.

Aspect 51: A non-transitory computer-readable medium storing a set of instructions for wireless communication, the set of instructions comprising one or more instructions that, when executed by one or more processors of a device, cause the device to perform the method of one or more of Aspects 27-36.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a channel state information (CSI) report configuration that indicates one or more parameters associated with detecting beam blocking;
      calculate one or more values corresponding to the one or more parameters based at least in part on measuring downlink reference signals indicated in the CSI report configuration; and
      transmit, using beam sweeping, a report that indicates the one or more values of the one or more parameters, wherein at least one of the one or more values of the one or more parameters is based at least in part on a time period during which a beam is blocked, wherein the report is transmitted using the beam sweeping based at least in part on the one or more values indicating that the beam is blocked, and wherein the report is associated with a negative acknowledgment indication.

2. The UE of claim 1, wherein the one or more parameters include a parameter that indicates an average reference signal received power measured across a bandwidth part configured for the UE during the time period during which the beam is blocked.

3. The UE of claim 1, wherein the one or more parameters include a parameter that indicates a maximum reference signal received power measured across all physical resource blocks for which the UE is configured to measure the downlink reference signals.

4. The UE of claim 1, wherein the one or more parameters include a parameter that indicates a minimum reference signal received power measured across all physical resource blocks for which the UE is configured to measure the downlink reference signals.

5. The UE of claim 1, wherein the one or more parameters include a parameter that indicates a difference among reference signal received power measurements for at least two of the downlink reference signals.

6. The UE of claim 5, wherein the difference is at least one of:
   a difference between a maximum reference signal received power measured across all physical resource blocks for which the UE is configured to measure the downlink reference signals and a minimum reference signal received power measured across the all physical resource blocks for which the UE is configured to measure the downlink reference signals,
   a difference between reference signal received power measurements for one or more pairs of physical resource blocks for which the UE is configured to measure the downlink reference signals,
   a standard deviation among reference signal received power measurements for a set of physical resource blocks for which the UE is configured to measure the downlink reference signals, or
   a combination thereof.

7. The UE of claim 1, wherein the one or more parameters include a parameter that indicates a difference among wideband reference signal received power measurements at different times.

8. The UE of claim 1, wherein the one or more parameters include a parameter that indicates a difference among reference signal received power measurements that are measured at different times for a physical resource block.

9. The UE of claim 1, wherein the one or more parameters are configured in association with a CSI reference signal (CSI-RS) resource indicator for wideband CSI reporting or in association with a synchronization signal block index.

10. The UE of claim 1, wherein the report is associated with requesting a new beam.

11. The UE of claim 1, wherein the one or more parameters include a parameter that indicates a difference among power measurements that are measured at different times for a physical resource block.

12. The UE of claim 1, wherein the downlink reference signals include at least one of CSI reference signals (CSI-RSs) or synchronization signal blocks (SSBs).

13. A base station for wireless communication, comprising:
    a memory; and
    one or more processors, coupled to the memory, configured to:
        transmit, to a user equipment (UE), a channel state information (CSI) report configuration that indicates one or more parameters associated with detecting beam blocking;
        transmit, to the UE, downlink reference signals indicated in the CSI report configuration; and
        receive, from the UE and using beam sweeping, a report that indicates one or more values of the one or more parameters, wherein at least one of the one or more values of the one or more parameters is based on a time period during which a beam is blocked, wherein the report is received using the beam sweeping based at least in part on the one or more values indicating that the beam is blocked, and wherein the report is associated with a negative acknowledgement indication.

14. The base station of claim 13, wherein the one or more processors are further configured to:
    determine whether the beam is blocked based at least in part on the report; and
    selectively identify a new beam for communication with the UE or perform radio link adaptation on an active beam for the UE based at least in part on determining whether the beam is blocked.

15. The base station of claim 13, wherein the one or more processors are further configured to determine that the beam is blocked, select a new beam, perform a beam management procedure, or retransmit a communication based at least in part on the report.

16. The base station of claim 13, wherein the one or more parameters include at least one of:
    a parameter that indicates an average reference signal received power measured across a bandwidth part configured for the UE during the time period during which the beam is blocked,
    a parameter that indicates a maximum reference signal received power measured across all physical resource blocks for which the UE is configured to measure the downlink reference signals, or
    a parameter that indicates a minimum reference signal received power measured across the all physical resource blocks for which the UE is configured to measure the downlink reference signals.

17. The base station of claim 13, wherein the one or more parameters include a parameter that indicates a difference among reference signal received power measurements for at least two of the downlink reference signals.

18. The base station of claim 17, wherein the difference is at least one of:
    a difference between a maximum reference signal received power measured across all physical resource blocks for which the UE is configured to measure the downlink reference signals and a minimum reference signal received power measured across the all physical resource blocks for which the UE is configured to measure the downlink reference signals,
    a difference between reference signal received power measurements for one or more pairs of physical resource blocks for which the UE is configured to measure the downlink reference signals,
    a standard deviation among reference signal received power measurements for a set of physical resource blocks for which the UE is configured to measure the downlink reference signals, or
    a combination thereof.

19. The base station of claim 13, wherein the one or more parameters include at least one of:
    a parameter that indicates a difference among wideband reference signal received power measurements at different times, or
    a parameter that indicates a difference among reference signal received power measurements that are measured at different times for a physical resource block.

20. The base station of claim 13, wherein the one or more parameters are configured in association with a CSI reference signal (CSI-RS) resource indicator for wideband CSI reporting or in association with a synchronization signal block index.

21. The base station of claim 13, wherein the report is associated with requesting a new beam.

22. The base station of claim 13, wherein the one or more parameters include a parameter that indicates a difference among power measurements that are measured at different times for a physical resource block.

23. The base station of claim 13, wherein the downlink reference signals include at least one of CSI reference signals (CSI-RSs) or synchronization signal blocks (SSBs).

24. A base station for wireless communication, comprising:
a memory; and
one or more processors, coupled to the memory, configured to:
transmit, to a user equipment (UE), a sounding reference signal (SRS) configuration that indicates an SRS resource set for transmission of SRSs;
measure one or more SRSs in the SRS resource set; and
calculate one or more values corresponding to one or more parameters associated with detecting beam blocking based at least in part on measuring the one or more SRSs, wherein at least one of the one or more values of the one or more parameters is based at least in part on a time period during which a beam is blocked, wherein a report that indicates the one or more values is communicated using beam sweeping based at least in part on the one or more values indicating that the beam is blocked, and wherein the report is associated with a negative acknowledgement indication.

25. The base station of claim 24, wherein the one or more parameters include at least one of:
a parameter that indicates an average reference signal received power measured across a bandwidth part configured for the UE during the time period during which the beam is blocked,
a parameter that indicates a maximum reference signal received power measured across all physical resource blocks included in the SRS resource set,
a parameter that indicates a minimum reference signal received power measured across the all physical resource blocks included in the SRS resource set,
a parameter that indicates a difference among reference signal received power measurements for at least two of the one or more SRSs,
a parameter that indicates a difference among wideband reference signal received power measurements at different times, or
a parameter that indicates a difference among reference signal received power measurements that are measured at different times for a physical resource block.

26. A method of wireless communication performed by a user equipment (UE), comprising:

receiving a channel state information (CSI) report configuration that indicates one or more parameters associated with detecting beam blocking;
calculating one or more values corresponding to the one or more parameters based at least in part on measuring downlink reference signals indicated in the CSI report configuration; and
transmitting, using beam sweeping, a report that indicates the one or more values of the one or more parameters, wherein at least one of the one or more values of the one or more parameters is based at least in part on a time period during which a beam is blocked, wherein the report is transmitted using the beam sweeping based at least in part on the one or more values indicating that the beam is blocked, and wherein the report is associated with a negative acknowledgement indication.

27. The method of claim 26, wherein the one or more parameters include at least one of:
a parameter that indicates an average reference signal received power measured across a bandwidth part configured for the UE during the time period during which the beam is blocked,
a parameter that indicates a maximum reference signal received power measured across all physical resource blocks for which the UE is configured to measure the downlink reference signals,
a parameter that indicates a minimum reference signal received power measured across the all physical resource blocks for which the UE is configured to measure the downlink reference signals,
a parameter that indicates a difference among reference signal received power measurements for at least two of the downlink reference signals,
a parameter that indicates a difference among wideband reference signal received power measurements at different times, or
a parameter that indicates a difference among reference signal received power measurements that are measured at different times for a physical resource block.

28. The method of claim 26, wherein the one or more parameters are configured in association with a CSI reference signal (CSI-RS) resource indicator for wideband CSI reporting or in association with a synchronization signal block index.

29. The method of claim 26, wherein the report is associated with requesting a new beam.

30. The method of claim 26, wherein the one or more parameters include a parameter that indicates a difference among power measurements that are measured at different times for a physical resource block.

* * * * *